(12) United States Patent
Currie et al.

(10) Patent No.: US 11,226,503 B2
(45) Date of Patent: Jan. 18, 2022

(54) TUNABLE SPECTRAL FILTERS

(71) Applicant: The Government of the United States of America, as represented by the Secretary of the Navy, Arlington, VA (US)

(72) Inventors: Marc Currie, Washington, DC (US); Virginia D. Wheeler, Alexandria, VA (US); Guy Beadie, Falls Church, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 297 days.

(21) Appl. No.: 16/713,032

(22) Filed: Dec. 13, 2019

(65) Prior Publication Data

US 2021/0181542 A1  Jun. 17, 2021

(51) Int. Cl.
*G02F 1/01* (2006.01)

(52) U.S. Cl.
CPC .......... *G02F 1/0147* (2013.01); *G02F 1/0102* (2013.01); *G02F 2203/055* (2013.01)

(58) Field of Classification Search
CPC . G02F 1/0147; G02F 1/0102; G02F 2203/055
USPC ....................................................... 359/288
See application file for complete search history.

(56) References Cited

U.S. PATENT DOCUMENTS

| 6,816,636 B2 | 11/2004 | Cole et al. |
| 9,952,096 B2 | 4/2018 | Kats et al. |
| 2015/0116721 A1 | 4/2015 | Kats et al. |
| 2015/0362374 A1 | 12/2015 | Wheeler et al. |
| 2019/0064555 A1 | 2/2019 | Hosseini et al. |
| 2021/0055626 A1* | 2/2021 | Jeong ................... G02B 6/2856 |

FOREIGN PATENT DOCUMENTS

| KR | 20170107349 A | 9/2017 |
| KR | 20190118750 A | 10/2019 |

OTHER PUBLICATIONS

Search Report and Written Opinion dated Apr. 22, 2021 in corresponding International Application No. PCT/US2020/063248.

(Continued)

*Primary Examiner* — William Choi
(74) *Attorney, Agent, or Firm* — US Naval Research Laboratory; Joslyn J. Barritt

(57) ABSTRACT

A tunable spectral filter comprising a phase change material is incorporated into a multilayered dielectric structure. The dielectric permittivity, and thus the filter properties, of the structure can be modified by producing a change in the phase change material, e.g., causing a metal-insulator transition. By controllably causing such a change in the dielectric permittivity of the phase change material, the spectral transmittance and reflectance of the structure, and thus its filter properties, can be modified to provide a predetermined transmittance or reflectance of electromagnetic radiation incident on the structure. In preferred embodiments, the phase change material layer is a vanadium dioxide ($VO_2$) film formed by atomic layer deposition (ALD).

16 Claims, 7 Drawing Sheets

(56) References Cited

OTHER PUBLICATIONS

Peter H. Berning and A. F. Turner, "Induced Transmission in Absorbing Films Applied to Band Pass Filter Design," J. Opt. Soc. Am. 47, 230-239 (1957).
Xi Wang et al., "Tunable Bragg Filters with a phase transition material defect layer," Opt. Express 24, 20365-20372 (2016).
Marc Currie et al., "Atomic Layer Deposition of Vanadium Dioxide and a Temperature-dependent Optical Model," J. Vis. Exp. (135), e57103, doi:10.3791/57103 (2018).
M. Currie et al., "Characterizing the tunable refractive index of vanadium dioxide," Opt. Mater. Express, vol. 7, No. 5, pp. 1697-1707 (2017).

* cited by examiner

TUNABLE SPECTRAL FILTERS

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case No. 109824.

TECHNICAL FIELD

The present invention relates to tunable spectral filters, particularly to tunable spectral filters that incorporate a phase change material into a layered dielectric structure.

BACKGROUND

Static spectral filters are useful in modern photonic systems. Currently, the ability to change the spectral behavior of these filters often utilizes mechanical methods, e.g., by mechanically changing between multiple filters in a filter wheel, or by mechanically changing the angle of a single filter. The advantage of non-mechanical tuning of spectral filters can reduce system complexity, result in a more robust system, and broaden the filter's spectral tuning parameters.

Combining multiple coherent optical beams can produce spatial and spectral interference patterns. The coherent superposition of multiple optical beams produces this interference behavior depending on the optical phase of the interfering beams. The relative phase difference of the beams is determined by the difference in their optical paths. For example, beams with optical path length differences of integer wavelengths constructively interfere, while those with optical path length differences of odd multiples of half wavelengths destructively interfere.

Using this property, optical interference filters using dielectric coatings can be made by changing the thickness and reflectance of each interface to produce an optical path length difference such that the reflected/transmitted light is almost totally transmitted (for example, an anti-reflection coating useful for reducing glare and ghosting in eyeglasses and windows) or almost totally reflected (for example, dielectric mirrors for use in optical cavities such as lasers).

The ability to make these types of devices becomes more complex when the optical path length difference is neither whole nor half-wavelength, for example when using polychromatic light. Using polychromatic light, e.g., white light, an integer optical path length at one wavelength is a non-integer multiple of most other wavelengths.

Another complexity that impacts this type of optical interference filters is the angle of incidence of the light. Light incident at different angles will see a different effective optical thickness, thereby, creating different behavior at one angle when compared with another. This can be advantageous, as mechanically tuning the angle can modify the properties of the interference filter.

For making interference filters that work over a broad optical bandwidth, a multilayer method is often used in which pairs of alternating ¼-wavelength-thick materials having high and low refractive indices, respectively, are arranged in a stack to form a dielectric mirror. One way to increase the spectral (polychromatic) reflectance of such mirrors is to increase the difference in refractive index of the pairs. In addition, one way to increase the reflectance amplitude is to increase the number of pairs, since increasing the periodicity (of the alternating pairs) magnifies the attributes.

Such interference filters have been designed and constructed for more than just anti-reflection coatings and highly-reflecting dielectric mirrors. More complex designs (and applications) include long-, short-, and band-pass filters, notch filters, beam splitters, polarizers, and more. And designs allow spectral coverage over a large portion electromagnetic spectrum (from UV, visible, infrared to the THz and microwave).

These rudimentary models fail when one or more of the materials used for such filters is absorbing. In such cases, the material's refractive index is a complex number, with the material's absorption affecting the imaginary part of the refractive index. This requires a more intricate model since the complex refractive index impacts the magnitude and phase of the reflection and transmission differently. On the positive side, however, designing dielectric interference filters with absorbing layers enables characteristics that are not possible with non-absorbing dielectric materials. For example, interference filters have been fabricated using a combination of metal and dielectric films. See Peter H. Berning and A. F. Turner, "Induced Transmission in Absorbing Films Applied to Band Pass Filter Design," *J. Opt. Soc. Am.* 47, 230-239 (1957).

A spectral filter can be tuned by changing the dielectric permittivity of the material(s) in a dielectric stack. One way to achieve this permittivity change is to use materials whose dielectric properties change due to a change in phase of the material.

Of particular use for spectral filters are phase change materials which undergo a large change in optical properties when changing their phase. A material which undergoes a metal-insulator transition is an example of this since the material dramatically changes the dielectric properties of the material (from that of a metal to that of an insulator). Not all materials undergo a metal-insulator transition upon phase change, although the dielectric permittivity of such materials can still be changed. A phase change in such materials can be induced by modifying the temperature of the material, applying electric or magnetic fields, or by applying mechanical strain and/or pressure. For example, $TiO_2$, which has an anatase phase having a room-temperature refractive index of about 2.5 and a rutile phase having a room-temperature refractive index of about 2.8, undergoes a change (without a metal-insulator transition) from the anatase phase to the rutile phase at temperatures near 600° C. The transition in crystalline phase-change materials can either be latching (i.e., irreversible change) as with the anatase-to-rutile transition of $TiO_2$, or volatile (i.e., reverses when external stimulus is removed) as in the monoclinic-to-tetragonal transition of vanadium dioxide ($VO_2$).

In addition, to continuously tune this type of optical filter the phase change material needs to have a smooth and stable transition between the phases. Otherwise, the filter is switched between two states in a binary fashion, with potential hysteresis upon reversal.

One phase change material that has been used for spectral applications is $VO_2$, which undergoes a reversible metal-insulator transition typically induced through modification of its temperature, though strain-induced and field-effect transitions have also been observed.

Cole et al. used $VO_2$ as a resistive layer to heat and thereby tune the wavelength of the Fabry-Perot optical filters by using the electrical rather than the optical properties of the VO$_2$ layer. See U.S. Pat. No. 6,816,636 to Cole et al., "Tunable Optical Filter" (2004).

However, VO$_2$ has very high optical absorption, and so has often been ruled out for use in multilayer optical films, with only a single layer of VO$_2$ being used rather than it being incorporated into a stack. For example, Wang et al. used VO$_2$ as a defect layer rather than as an active optical layer, in a manner similar to that suggested by Berning and Turner, supra, i.e., to add a metal film to couple/decouple two dielectric stacks. See Xi Wang et al., "Tunable Bragg Filters with a phase transition material defect layer," *Opt. Express* 24, 20365-20372 (2016). That is, Wang et al. tuned their multilayered Bragg filter using the metal-insulator transition of VO$_2$ to frustrate the coupling between two dielectric stacks, rather than using the dielectric optical properties of VO$_2$ layers, since the absorption per layer of VO$_2$ would hinder the performance of their filter.

Similarly, Kats et al. describe the VO$_2$/phase change material as a highly absorbing layer (large k, k>0.5), stating that "[H]ighly absorbing dielectrics are generally not used because wavelength-scale propagation through such media may limit coherent optical effects." See U.S. Pat. No. 9,952,096, "Ultra-Thin Optical Coatings and Devices and Methods of Using Ultra-Thin Optical Coatings" (2018). They therefore consider a single, ultrathin layer, and often focus on the absorption of the film, stating that "[t]he ultra-thin film is comprised of a 'highly lossy dielectric material' whose absorption loss can be tuned to a desired value."

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a tunable spectral filter comprising a phase change material incorporated into a multilayered dielectric structure. The dielectric permittivity, and thus the filter properties, of the structure can be modified by causing a metal-insulator transition in the phase change material. By controllably causing such a change in the dielectric permittivity of the phase change material, the transmittance and reflectance of the structure, and thus its filter properties, can be modified to provide a predetermined transmittance or reflectance of electromagnetic radiation incident on the structure.

In many embodiments, the phase change material will be VO$_2$, which undergoes a metal-insulator transition upon the application of a temperature change in the material, though other phase change materials and other means for inducing a change in the dielectric permittivity thereof may also be used as appropriate.

DETAILED DESCRIPTION

Figure 1:
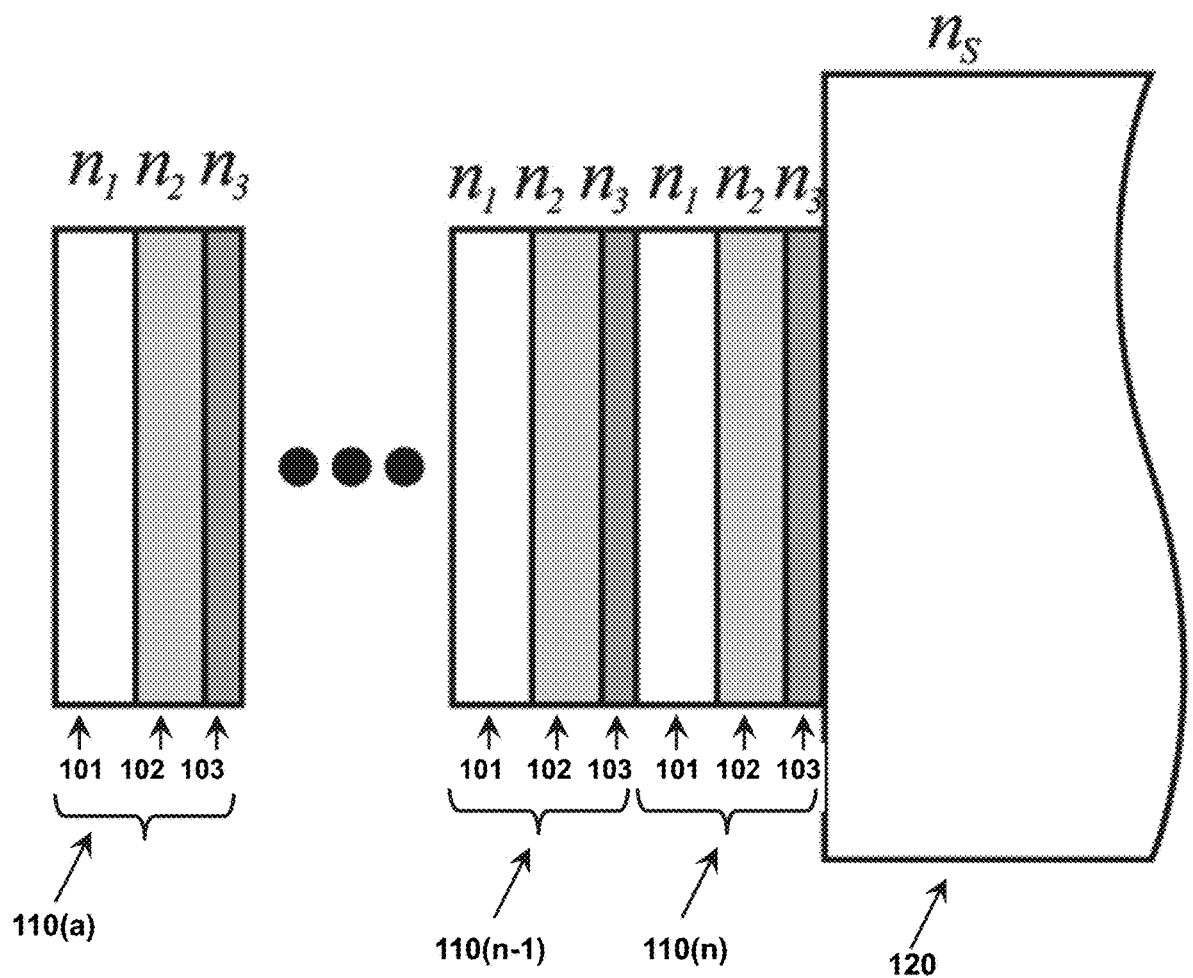
FIG. 1 is a block schematic illustrating an exemplary embodiment of a tunable spectral filter incorporating a phase change material in a layered dielectric structure in accordance with the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a tunable spectral filter comprising a phase change material incorporated into a multilayered dielectric structure. As described in more detail below, the dielectric permittivity, and thus the filter properties, of the structure can be modified by causing a metal-insulator transition in the phase change material. By controllably causing such a change in the dielectric permittivity of the phase change material, the transmittance and reflectance of the structure, and thus its filter properties, can be modified to provide a predetermined transmittance or reflectance of electromagnetic radiation incident on the structure.

Some of these phase change materials are highly absorptive of light at most wavelengths, which has made them considered to be unsuitable for use in a multi-layered optical filter. However, while these phase change materials can be absorptive, these materials can also have a high refractive index whose magnitude can be modulated through their phase change. For example, as described above in the case of phase change materials such as VO$_2$, the change in their dielectric properties, including their index of refraction, can be is very large when the materials undergo a phase change. Therefore, by embedding a very thin layer of these phase change materials within a period of a multilayer dielectric stack, a structure having negligible loss can be produced; by increasing the number of periods having an embedded phase change material in the stack, the total change in the refractive index of the stack upon a change in the material's phase can be amplified while maintaining the overall low absorption of the stack.

The present invention therefore provides an improved multilayered filter structure which includes a phase change material as an integral part of the filter, wherein layers of the phase change material are distributed throughout the multi-layered structure and wherein the filter properties of the multilayered structure can be tuned by tuning the dielectric permittivity of the phase change material, e.g., by changing the temperature of the filter, applying electric or magnetic fields, or by applying mechanical strain and/or pressure.

Thus, in accordance with the present invention, a tunable spectral filter can be formed by modifying a conventional repeating high-index/low-index multilayered structure, wherein the high-index material layer is replaced by a layer of a lossless high-index material for the majority of the layer thickness coupled with an ultrathin layer of a phase change material having a refractive index similar to that of the high-index material. Since the phase change material is ultrathin, the loss due to absorption within the material is mitigated, while large changes in the optical properties of the stack can be produced by repeated layering of the high-index material/phase change material structure. Typical layer thicknesses are designed based upon the wavelength of light, such that a single material layer thickness is between 0.1 and 1.0 wavelengths thick, where the thickness is optimized for the desired spectral reflectance and transmittance of the filter. In our tunable filters, this allows the ultrathin phase change material to be approximately 0.01 to 0.10 times smaller than the thickness of a single static layer to achieve the desired tunability. Examples of static dielectric materials for use in optical filters are silicon, silicon oxides, silicon nitrides, calcium fluoride, magnesium fluoride, aluminum oxide, titanium oxide, zinc sulfide, zinc selenide, zinc telluride, etc. In other embodiments, if the phase change material has a low-enough refractive index, one could instead break the low-index layer into two parts (e.g., a thicker lossless part and an ultrathin phase change material part). This would allow integration with current design models, while enabling filter tunability of the filter through dynamic modifications of the phase change material.

As noted above, vanadium oxide ($VO_2$) is a phase change material that has been used in spectral filters, but due to its very high optical absorption has not previously been used as a layer in a repeating multilayer stack configuration such as that used in the present invention; instead, it has only been used as a single layer within a multilayered structure comprising other materials. See, e.g., Wang, supra, where a single $VO_2$ layer serves as a defect layer in a Bragg filter formed by a stacked $TiO_2/SiO_2$ layered structure.

Researchers at the U.S. Naval Research Laboratory (NRL), including some of the inventors of the present invention, have developed a growth technique that enables production of $VO_2$ by atomic layer deposition (ALD) which produces higher quality ultrathin $VO_2$ films (referred to herein as "ALD-$VO_2$ films") having lower loss than had been possible with $VO_2$ films produced using conventional techniques. See Marc Currie et al., "Atomic Layer Deposition of Vanadium Dioxide and a Temperature-dependent Optical Model," *J. Vis. Exp.* (135), e57103, doi:10.3791/57103 (2018).

In addition, such ALD-$VO_2$ films are more stable than those produced using conventional techniques, such that their metal-insulator transition can be gradually tuned so as to result in a gradual change in their dielectric properties. The dielectric properties of such ALD-$VO_2$ films are stable even if the tuning is stopped at any point within the transition region. See M. Currie et al., "Characterizing the tunable refractive index of vanadium dioxide," Opt. Mater. Express, vol. 7, no. 5, pp. 1697-1707 (2017). The transition temperature at which these ALD-$VO_2$ films change between metal and insulator can be modified to occur anywhere between 20 and 80° C. by altering the material's crystallinity and strain (e.g., via doping) during the ALD process; this wide range of transition temperatures enables a wide variety of control over the phase change process.

The low loss of these ALD-$VO_2$ films enable a more significant change in dielectric properties upon phase transition, thereby, enabling a greater change in filter properties. This allows for either thinner layers of phase change materials (thereby reducing filter losses further) or layers with higher contrast (with lower-loss than other state of the art $VO_2$ films).

Thus, the present invention provides a tunable spectral filter that incorporates a phase change material into a layered dielectric structure. While at present it appears that ALD-$VO_2$ films developed at NRL may be preferred because of their high-quality and low-loss one skilled in the art will recognize that high-quality, low-loss films made from other phase change materials using other techniques that may be developed will also be suitable for use in the tunable spectral filters described and claimed herein, and filters using all such phase change materials are deemed to be within the scope and spirit of the present disclosure.

The dielectric properties of the phase change material in combination with a multilayer dielectric structure described above provide a unique avenue towards a wide array of applications.

The block schematic in FIG. 1 illustrates an exemplary embodiment of a tunable spectral filter that incorporates a phase change material into a layered dielectric structure in accordance with the present invention.

As illustrated in FIG. 1, such a tunable spectral filter includes a plurality of repeating layered structures 110(*a*) . . . 110(*n*). Each of the layered structures 110(*a*) . . . 110(*n*) comprises a low-index dielectric material 101 having a corresponding refractive index $n_1$ adjacent to a high-index dielectric material 102 having a corresponding refractive index $n_2$, 112 being higher than $n_1$, and further comprises a phase change material 103 situated adjacent to dielectric material 102, the phase change material 103 having a corresponding index of refraction $n_3$ which is higher than the index of refraction 112 of adjacent dielectric material 102. Note that in other embodiments materials having other relative indices of refraction may be used, e.g., where $n_1 < n_3 < n_2$. In either case, the plurality of layered structures is mounted onto a substrate 120 comprising dielectric material having an index of refraction $n_s$ where $n_s$ is lower than any one of $n_1$, $n_2$, or $n_3$. It should be noted that in other embodiments, the dielectric and phase change material layers can be mounted on a high index substrate, with the stack order reversed, i.e., $n_3$, $n_2$, $n_1$, such that the low-index ($n_1$) is adjacent to the substrate. Other embodiments with other orders of the dielectric material layers may also be possible.

The transmittance and reflectance of these multilayered structures depends on the thickness and dielectric permittivity of each material. When the dielectric permittivity of the phase change material is changed, the index of refraction $n_3$ of the phase change material will also be changed, and so the transmissive and reflective properties of the filter will be modified. Thus, by controllably modifying the dielectric permittivity of the phase change material in at least one of the layered stacks, e.g., by changing the temperature of the filter, applying electric or magnetic fields, or by applying mechanical strain and/or pressure to the phase change material, a spectral filter in accordance with the present invention can be tuned to provide predetermined filtering properties.

FIGS. 2A-2D illustrate additional embodiments of layer structures which can be used to implement a tunable spectral filter in accordance with the present invention. In an exemplary embodiment, each of the dielectric layers can each have a thickness of about 5-50 nm, while the phase change material layer can have a thickness of about 2-10 nm, though one skilled in the art will readily understand that the thickness of the material layers may vary depending on the material used and the optical properties desired.

Figure 2A:
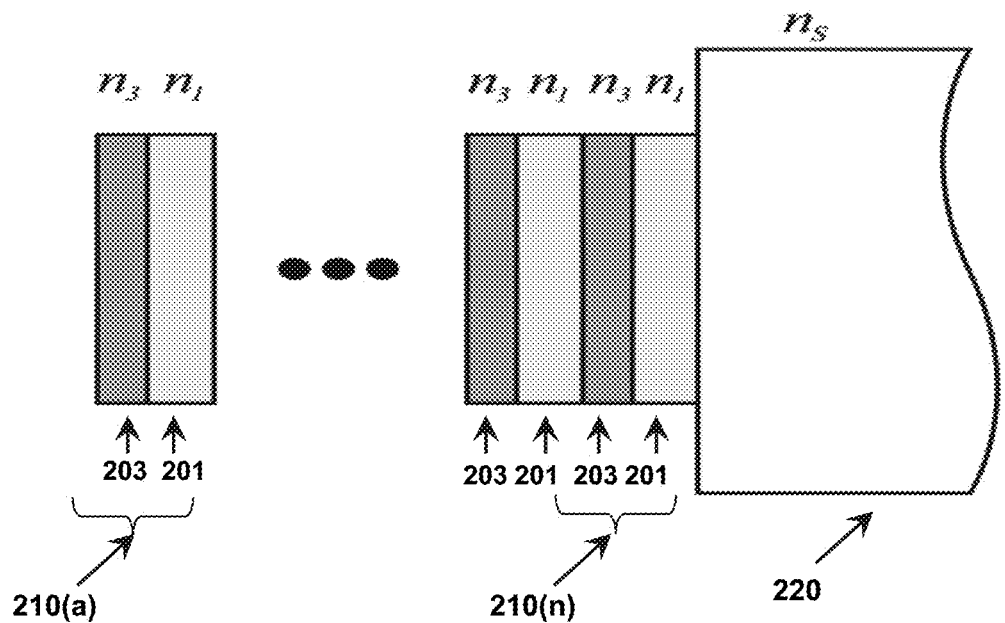
FIGS. 2A-2D are block schematics illustrating exemplary alternative embodiments of a tunable spectral filter incorporating a phase change material in a layered dielectric structure in accordance with the present invention.

In the embodiment illustrated in FIG. 2A, the filter comprises a plurality of dielectric layer structures 210(a) . . . 210(n) mounted on a substrate 220 comprising dielectric material having an index of refraction $n_s$, where each of the dielectric layer structures 210 (a) . . . 210 (n) comprises materials 203 and 201 having corresponding indices of refraction $n_3$ and $n_1$, where either or both of 203 and 201 are a phase change material. Incorporating multiple layers of phase change material as an integral part of the repeating stack structure of the filter enables more control of the filter's transmissive/reflective properties and performance than is possible with current state of the art optical filters such as those described in Wang, supra, which merely include a single layer of a phase change material as a defect layer in a stack consisting of other dielectric materials.

Figure 2B:
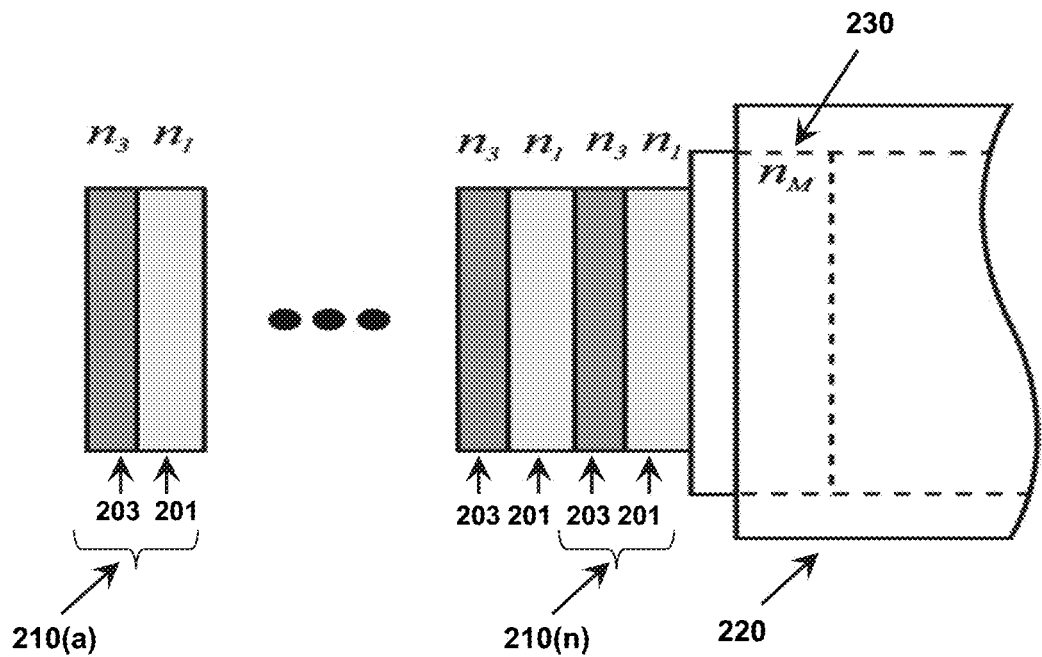

FIG. 2B illustrates an alternative embodiment of a tunable spectral filter in accordance with the present invention. As in the embodiment illustrated in FIG. 2A, the filter embodiment illustrated in FIG. 2B includes a plurality of dielectric layered structures 210(a) . . . 210(n) on a substrate 220, each comprising dielectric materials 203 and 201, where one or more of 203 and 201 is a phase change material. In addition, in embodiment illustrated in FIG. 2B, substrate 220 further incorporates a (e.g., 50-500 nm) membrane 230 having an index of refraction nm which further influences the transmittance properties of the filter since a membrane permits use of materials whose bulk properties would otherwise be too restrictive for use in an optical filter (e.g., absorption, thermal conductivity, etc.). For example, if a substrate is too absorptive to light, it could be made thinner (thereby reducing the optical absorption) to form a membrane. In another example, a thin membrane could permit heating and cooling with much less power than with a more thermally conductive bulk substrate, thereby producing a low-power, temperature tunable filter by changing the permittivity of the phase change material.

Figure 2C:
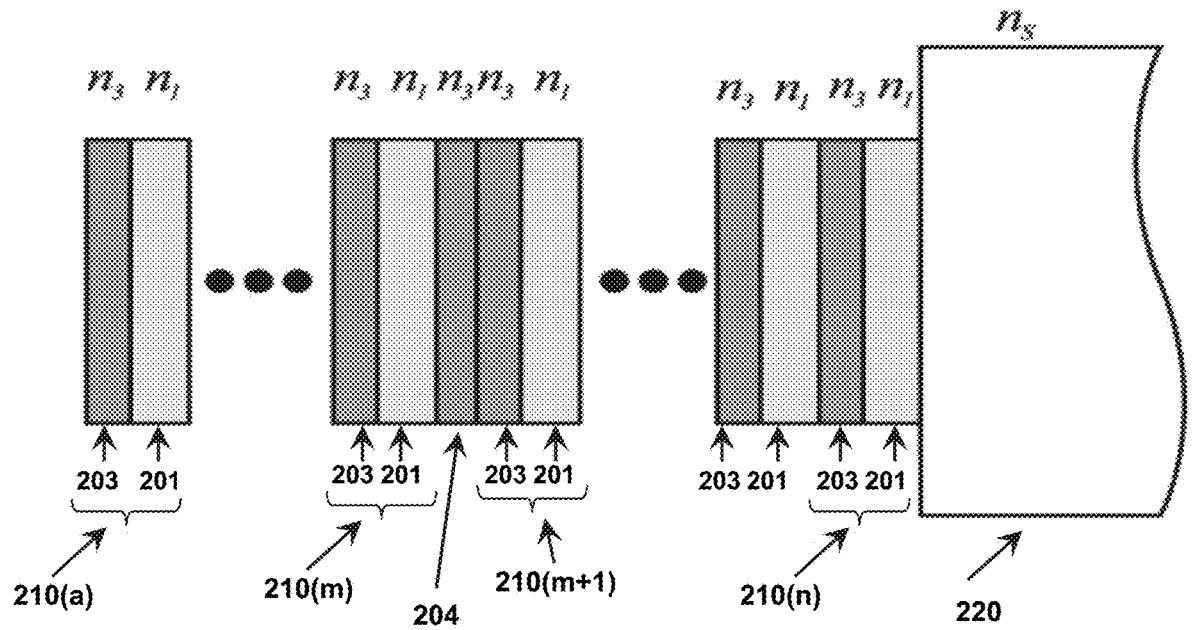

FIG. 2C illustrates another exemplary embodiment of a tunable spectral filter incorporating a phase change material in accordance with the present invention. In the embodiment illustrated in FIG. 2C, the filter structure is similar to that illustrated in FIG. 2A, but instead of the structure comprising only alternating stacks 210(a) . . . 210(n) of layered materials 203 and 201, the structure includes at least one repeating layer 204 comprising a material having the same index of refraction as the material used for either layer 201 or layer 203. For example, as shown in FIG. 2C, layer 204 comprises a material having the same index of refraction $n_3$ as the material used for repeating layer 203. The addition of such a repeated layer can create more complex filter properties, e.g., narrower passbands. In some embodiments, the change in amplitude can be tuned by tuning the thickness of the repeating layer. In other embodiments, the change in amplitude can be tuned by using a phase change material for the repeating layer, where the effects from changes in the phase change material's permittivity as described above produce even greater effect on the filter's performance when a repeating phase change layer is present. As with all of the embodiments described herein, by tuning the change in the phase change material's permittivity, a spectral filter in accordance with the present invention can be tuned to have a predetermined degree of transmittance or reflectance.

Figure 2D:
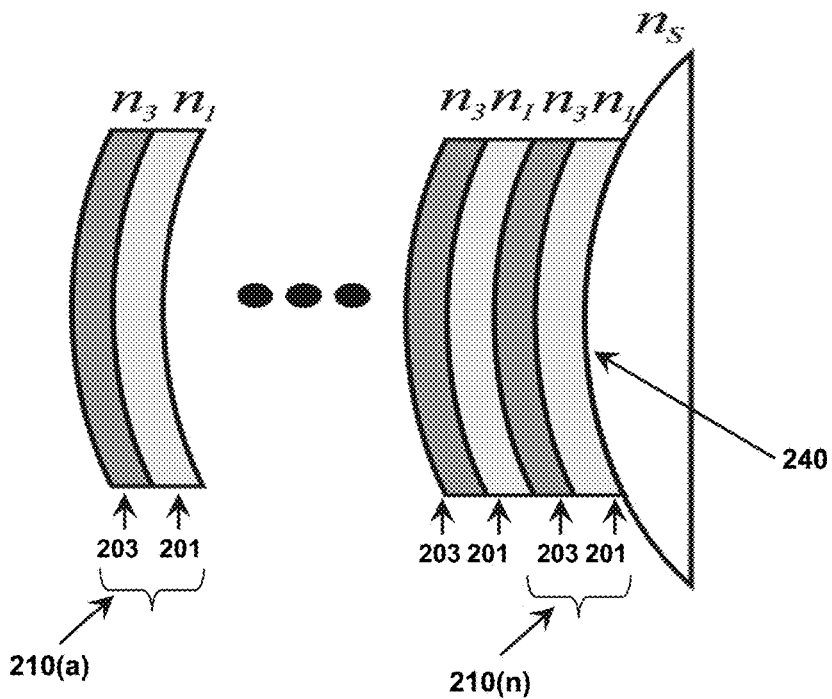

In still other embodiments, a tunable spectral filter in accordance with the present invention can include a multi-layer structure on a non-planar substrate surface 240, as illustrated in FIG. 2D. In such embodiments, in one or more periods 210(a) . . . 210(n) of the layered structures of dielectric materials 203 and 201, the layers are also non-planar, with the layers in period 210 (n) adjacent to the nonplanar substrate surface 240 conforming to the shape of the substrate surface. The operation of such a filter structure is similar to that for the planar filters described above with respect to FIG. 1 and FIGS. 2A-2C, but now contain intricacies of nonplanar optical surfaces.

A phase change material that undergoes a metal-insulator transition provides another unique capability for polarized optics. The change in the optical phase upon reflection are unequal for light polarized parallel and perpendicular to the plane of incidence with a metal. Thus, when changing from an insulator to a metal, these attributes enable difference passbands for different polarizations of light. This further enhances the capabilities of creating tunable optical filters from phase change materials with a metal-insulator transition.

Other alternative designs could provide additional advantages for specific operations, and one skilled in the art will readily recognize that other configurations of multilayered dielectric structures including one or more phase change materials can be used to make spectral filters whose properties are tuned by controlling the phase change material in accordance with the present invention.

To demonstrate the general concepts, devices having the design presented in FIG. 1 were examined by the inventors; the results of such examination are discussed below.

In one case, a device having the structure according to FIG. 1 was formed, where a nine-period stack of dielectric materials 101, 102 and phase change material 103 was formed on a fused silica substrate, where dielectric material 101 was fused silica having a thickness of 187 nm, dielectric material 102 was titanium dioxide ($TiO_2$) having a thickness of 150 nm, and phase change material 103 was vanadium dioxide ($VO_2$) having a thickness of 50 nm.

Figure 3:
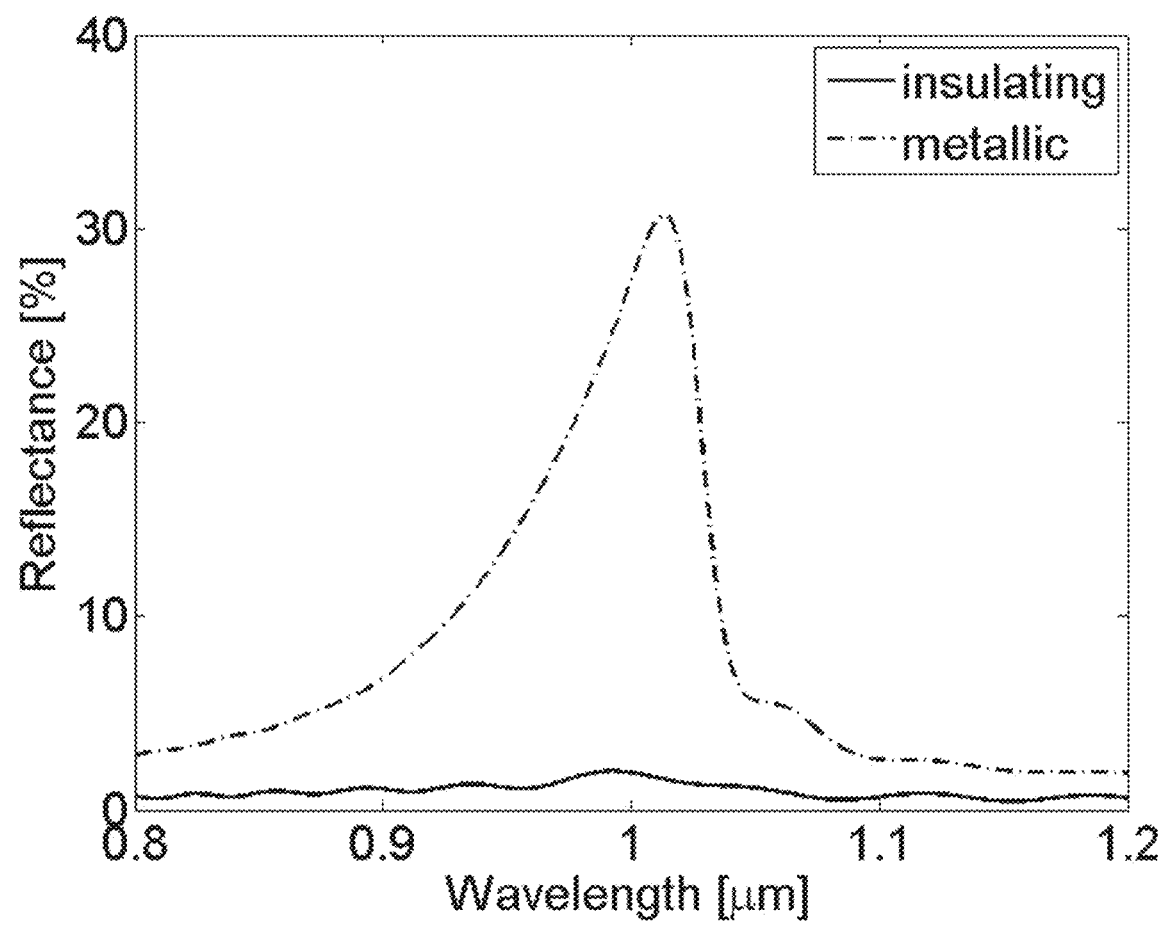
FIG. 3 is a plot illustrating the performance of an exemplary tunable filter incorporating a phase change material in a layered dielectric structure in accordance with the present invention.

The performance of this device is shown by the plot in FIG. 3.

As can be seen from the plot in FIG. 3, when the $VO_2$ phase change material was in an insulating state, the filter exhibited a low spectral reflectance at all wavelengths, but when the $VO_2$ phase change material was instead tuned to the metallic state, the filter's spectral reflectance dramatically increased to greater than 30% at wavelengths near 1 μm, while the low reflectance was maintained elsewhere. Thus, as demonstrated in FIG. 3, a tunable spectral filter in accordance with the present invention can be used as a tunable (or switchable) reflective bandpass filter.

Figure 4:
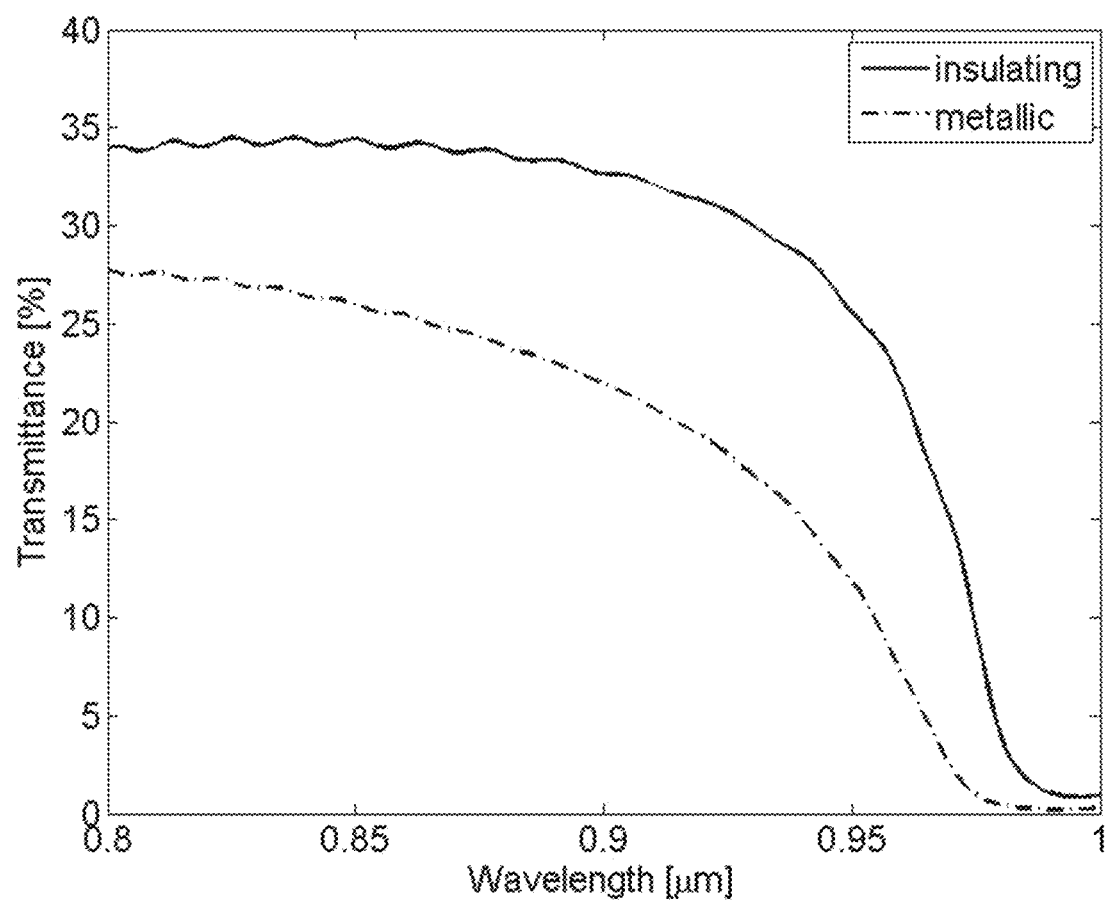
FIG. 4 is a plot illustrating the performance of another exemplary tunable filter incorporating a phase change material in a layered dielectric structure in accordance with the present invention.

The layered structure of FIG. 1 can also be used to construct a tunable short-pass filter. While the specific layer thicknesses will depend on the desired spectral operation of the filter, in an exemplary embodiment of such a short-pass filter, a 25-period stack of dielectric materials 101, 102 and phase change material 103 was formed on a fused silica substrate, where dielectric material 101 was fused silica having a thickness of 185 nm, dielectric material 102 was titanium dioxide ($TiO_2$) having a thickness of 192 nm, and phase change material 103 was vanadium dioxide ($VO_2$) having a thickness of 6 nm. As shown in FIG. 4, when the $VO_2$ phase change material is in the insulating state, the short-pass filter has an edge near 970 nm, but when the phase change material is tuned to the metallic state, the short-pass filter edge moves to shorter wavelengths near 950 nm. This can be used to tune passbands in spectral filters and spectroscopic measurements.

The layered structure of FIG. 1 can also be used to construct a tunable bandpass/band stop filter, where the layer thicknesses can be configured to cause the filter to function as a tunable bandpass filter when the phase change material layer is tuned to a metallic state. While the specific layer thicknesses will depend on the desired spectral operation of the filter, in an exemplary embodiment of such a bandpass/band stop filter, a 25-period stack of dielectric materials 101, 102 and phase change material 103 was formed on a fused silica substrate, where dielectric material 101 was fused silica having a thickness of 190 nm, dielectric material 102 was titanium dioxide ($TiO_2$) having a thickness of 150 nm, and phase change material 103 was vanadium dioxide ($VO_2$) having a thickness of 40 nm.

Figure 5A:
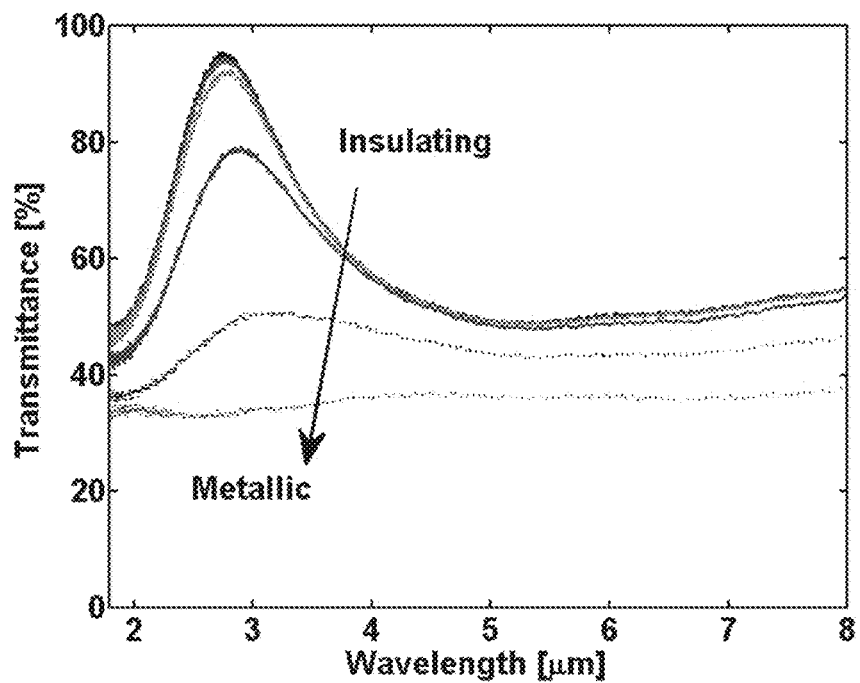
FIGS. 5A and 5B are plots illustrating the performance of an exemplary tunable bandpass/bandstop filter incorporating a phase change material in a layered dielectric structure in accordance with the present invention.
Figure 5B:
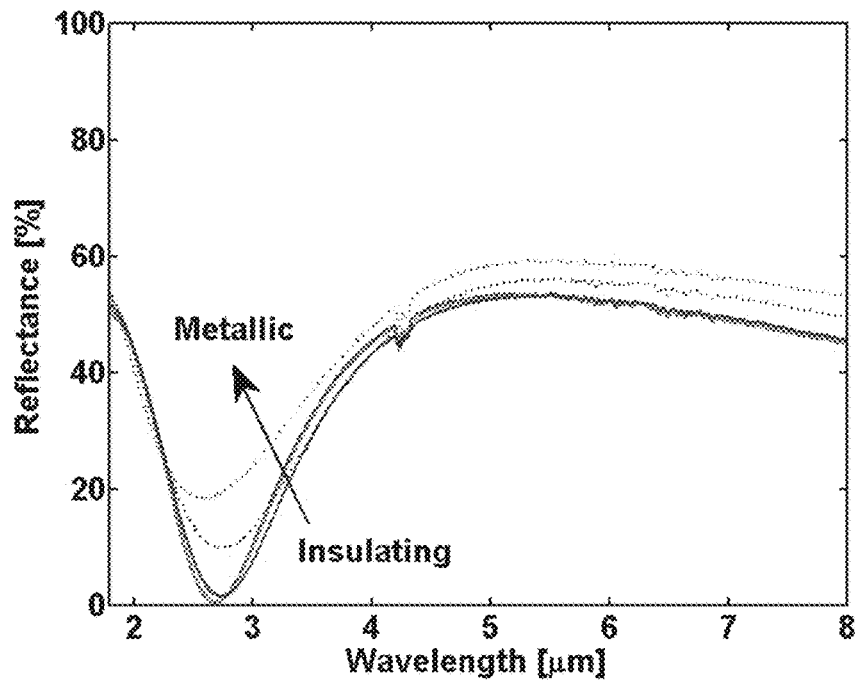

To further examine the utility of using phase change materials for tunable filter elements, a tunable bandpass/bandstop filter near 2.8 µm wavelength was fabricated by incorporating a single 45 nm layer of $VO_2$ into a dielectric layer structure disposed on a 500 nm-thick nanocrystalline diamond film. The performance of this structure is illustrated by the plots in FIGS. 5A and 5B. As shown in FIG. 5A, in transmission, this structure functioned as tunable bandpass filter, while as shown in FIG. 5B, in reflection it functioned as a tunable bandstop, or notch, filter.

Figure 6A:
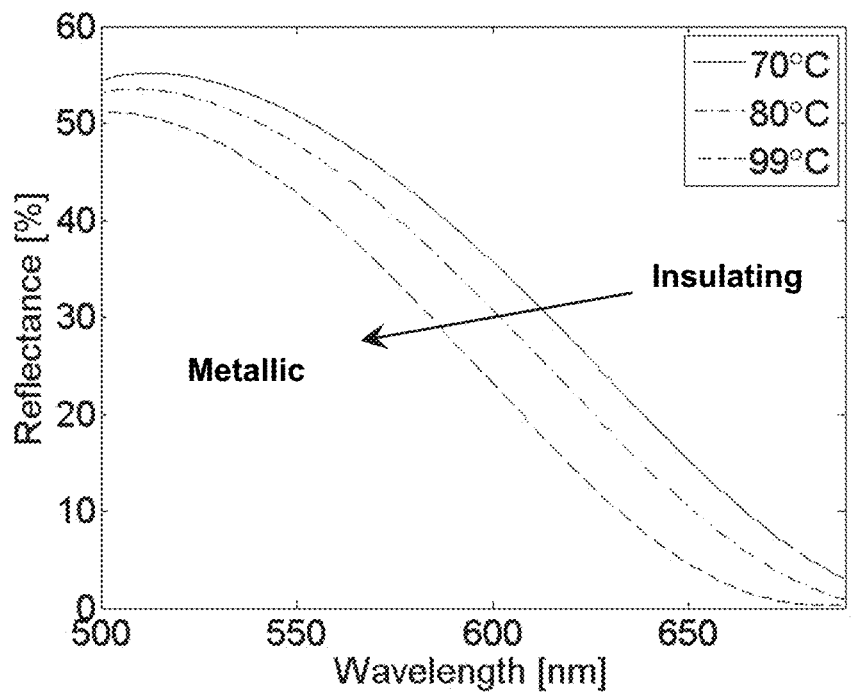
FIGS. 6A and 6B are plots illustrating the performance of an exemplary tunable edge filter incorporating a phase change material in a layered dielectric structure in accordance with the present invention.
Figure 6B:
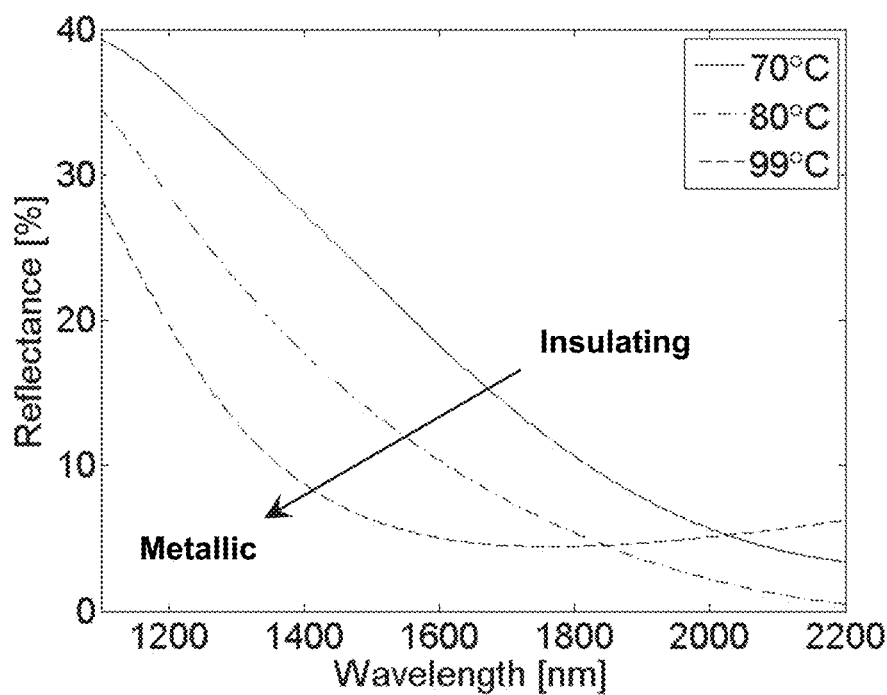

In another case, a tunable short-pass reflecting filter (for use in separating reflected light in the visible range from transmitted light in the near-IR wavelength range) was fabricated from a single 30 nm-thick layer of $VO_2$ on a 300 nm-thick $SiO_2$ film, which in turn was on a Si substrate. The filter performance of this structure was examined, with the results being shown by the plots in FIGS. 6A and 6B. As can be seen from the plots in FIG. 6A, in the visible and near-IR spectra, the reflectance of the filter shifts to shorter wavelengths as the $VO_2$ phase change material is tuned from being insulating to metallic. In addition, as shown by the plots in FIG. 6B, at longer wavelengths in the near-IR region, the filter is bistable. This bistability manifests itself near 2200 nm wavelength since as the temperature is monotonically increased, the reflectance first decreases to a minimum and then increases to a maximum, thereby having two stable reflective states separated by a (near) zero reflective state. This enables a wider variety of applications utilizing such bistable properties, e.g., oscillators and digital processing.

Alternatives

Although a tunable spectral filter in accordance with the present invention has often been described in the context of using $VO_2$ as the phase change material, one skilled in the art will readily understand that any volatile phase change material (e.g., $NbO_2$, GeTe, $SmNiO_3$, $Ti_4O_7$ etc.) can be used, so long the material's the dielectric properties change as the material changes phase.

In some embodiments, a tunable spectral filter in accordance with the present invention can be configured to include high index layers, low index layers, and phase change layers with thinner-than-quarter-wavelength thickness increments, without a strict periodicity in thicknesses. Such a structure can enable an almost continuously varying refractive index (as a function of thickness) which can be used for creating a tunable gradient-index filter, also known as a rugate filter, i.e., an optical filter based on a dielectric coating, where the refractive index is varied continuously (rather than in steps) at least in some part of the structure. In some cases, the refractive index varies in a sinusoidal oscillation, leading to reflection in some narrow wavelength region, and transmission in another. In transmission, one obtains a notch filter, which blocks some limited wavelength range, while in reflection one obtains a bandpass filter. Such filters are used, for example, as laser blocking filters in Raman spectroscopy. In some cases, it may be possible to combine multiple reflection bands in order to obtain multiple notch filters.

In some embodiments, one or more of the layered stacks can further include additional phase change materials, each having their own respective index of refraction and phase change behavior to enable further fine-tuning of the spectral properties of the filter.

Many additional uses in both the military and commercial environments could be realized from this invention. Such tunable filters could be used for a wide variety of molecular sensing, communication, biomedical instruments, on-chip spectroscopy, etc.

Advantages and New Features

Tunable filters are used in applications such as spectroscopy, sensing, communication, and imaging. One significant benefit of our proposed approach is the absence of mechanical tuning needed to vary the filter's spectral characteristics. This provides a reduction in system complexity by removing the mechanical elements, thereby resulting in a more compact and robust system.

One significant benefit of our proposed approach is the absence of mechanical tuning.

However, a combination of mechanical tuning with our tuning method would enable even broader capabilities.

An additional feature is that the filter's spectral properties (e.g., bandwidth, selectivity, etc.) can be customized by modifying the properties of the layered materials. Knowledge of the optical properties of these materials, such as NRL's model of the optical properties of vanadium dioxide, are critical to creating custom filter designs.

Another potential benefit is increased tuning speed, allowing more rapid tuning which is useful in applications such as modulation, gating, and switching.

A further benefit is that using atomic-layer deposition fabrication techniques, these dielectric films can conformally coat arbitrary three dimensional surfaces, creating complex structures and/or allowing for more complex tunable filter systems.

Finally, another advantage of this process is the ability to fabricate these multilayer structures for these tunable filters directly on a detector, sensor, or system.

SUMMARY

Spectral filters that incorporate a phase change material to enable their tuning to obtain desired reflectance or transmittance properties have been described. Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A tunable spectral filter, comprising:
a plurality of repeating stacks of dielectric material layers on a substrate, the substrate having an index of refraction $n_s$ that is lower than the index of refraction of any of the materials in the stack;
wherein each of the repeating stacks includes at least one phase change material layer integrated therein,
the phase change material layer being thinner than the other material layers in the stack and having an index of refraction that is higher than an index of refraction of any of the other materials in the stack;
wherein a dielectric permittivity of the phase change material layer can be controllably changed to tune the filter so as to provide a predetermined amount of spectral transmittance and/or reflectance of light incident on the filter.

2. The tunable spectral filter according to claim 1, wherein each dielectric material layer has a thickness of between 0.1 and 1.0 times a wavelength of light incident on the filter and the phase change material layer has a thickness of 0.01 to 0.10 times the thickness of a single static dielectric layer, wherein the thickness of the dielectric material layers is configured to obtain a desired spectral reflectance and transmittance of the filter.

3. The tunable spectral filter according to claim 2, wherein the phase change material comprises ALD-$VO_2$.

4. The tunable spectral filter according to claim 1, wherein each dielectric material layer in the stack has a thickness of 5-50 nm and the phase change material layer has a thickness of 2-10 nm.

5. The tunable spectral filter according to claim 1, wherein the dielectric materials in the stack comprise silicon dioxide, titanium dioxide, and vanadium dioxide.

6. The tunable spectral filter according to claim 1, wherein the phase change material comprises $NbO_2$, GeTe, $SmNiO_3$, $Ti_4O_7$, or $VO_2$.

7. The tunable spectral filter according to claim 1, further comprising a plurality of low-index dielectric material layers and a plurality of high-index dielectric material layers, wherein a thickness of each low-index dielectric material layer is about 190 nm and a thickness of each high-index dielectric material layer is about 150 nm, and further wherein a thickness of the phase change material layer is about 40 nm, wherein the thicknesses of the low-index dielectric material layer, the high-index dielectric material layer, and the phase change material layer are configured to cause the filter to function as a tunable bandpass filter when the phase change material layer is tuned to a metallic state.

8. The tunable spectral filter according to claim 1, further comprising a plurality of low-index dielectric material layers and a plurality of high-index dielectric material layers, wherein a thickness of each low-index dielectric material layer is about 185 nm and a thickness of each high-index dielectric material layer is about 195 nm, and further wherein a thickness of the phase change material layer is about 6 nm, wherein the thicknesses of the low-index dielectric material layer, the high-index dielectric material layer, and the phase change material layer are configured to cause the filter to function as a tunable notch filter when the phase change material layer is controllably tuned to an insulating or a metallic state.

9. The tunable spectral filter according to claim 1, wherein the substrate is diamond.

10. The tunable spectral filter according to claim 1, wherein the substrate further comprises a membrane adjacent the last stack in the filter, wherein the membrane has an index of refraction that of approximately 2 and a thickness of 500 nm to reduce the lateral conductivity and facilitate heating of the filter.

11. The tunable spectral filter according to claim 1, wherein each stack comprises two dielectric materials and a phase change material.

12. The tunable spectral filter according to claim 1, wherein each stack comprises one dielectric material and one phase change material.

13. The tunable spectral filter according to claim 1, wherein the filter includes at least one stack having at least one repeating layer of the phase change material integrated therein.

14. The tunable spectral filter according to claim 1, wherein the substrate has a non-planar surface adjacent to the final stack in the filter, wherein the final stack conforms to a shape of the non-planar surface.

15. The tunable spectral filter according to claim 1, wherein the filter is released from the substrate to create a free-standing, flexible-film filter.

16. A tunable gradient-index filter, comprising:
a plurality of repeating stacks of dielectric material layers on a substrate, the substrate having an index of refraction $n_s$ that is lower than the index of refraction of any of the materials in the stack;
wherein each of the repeating stacks includes a plurality of high-index dielectric material layers, a plurality of low-index dielectric material layers, and at least one phase change material layer;
wherein each of the high-index dielectric material layers, low-index dielectric material layers, and phase change material layer has a corresponding thickness less than one-quarter of a wavelength of an incident radiation of interest, the high-index dielectric material layers, low-index dielectric material layers, the thickness of the high-index dielectric material layers, the low-index dielectric material layers, and the phase change material layer in a first stack varying in a non-periodic manner from the corresponding thicknesses in a second stack to enable an almost continuously varying refractive index in the filter.

* * * * *